United States Patent [19]

Chuang

[11] Patent Number: 5,261,682
[45] Date of Patent: Nov. 16, 1993

[54] COLLAPSIBLE RECUPERATING WALKER

[76] Inventor: Ching-Pao Chuang, No. 120-18, Yu Che, Yu Che Li, Ma Tou Chen, Tainan Hsien, Taiwan

[21] Appl. No.: 934,311

[22] Filed: Aug. 25, 1992

[51] Int. Cl.⁵ .............. A61H 3/04; B62B 7/06; B62M 1/00
[52] U.S. Cl. ................................ 280/42; 280/650; 280/87.05; 280/47.4; 482/68; 297/5; 403/93; 403/96; 188/1.12; 188/74
[58] Field of Search ............ 280/87.021, 42, 647, 280/650, 651, 79.11, 79.2, 79.3, 47.4, 43.18, 47.41, 33.994, 87.05; 482/66, 67, 68; 403/92, 93, 95, 96; 16/44, 35 R; 188/1.12, 2 D, 74; 135/67; 297/5, 6

[56] References Cited

U.S. PATENT DOCUMENTS

| 385,138 | 6/1888 | Reinisch | 403/96 X |
|---|---|---|---|
| 2,077,569 | 4/1937 | Kish | 188/74 X |
| 3,409,105 | 11/1968 | Clinton | 16/35 R X |
| 3,516,425 | 6/1970 | Rigal | 135/67 |
| 4,253,678 | 3/1981 | Leclerc | 280/42 |
| 4,461,471 | 7/1984 | Braston | 482/68 |
| 4,770,559 | 9/1988 | Yoo | 403/93 |
| 5,133,377 | 7/1992 | Truxillo | 297/5 |

FOREIGN PATENT DOCUMENTS 2127357  4/1984  United Kingdom .............. 280/651

Primary Examiner—Margaret A. Focarino
Assistant Examiner—Peter English
Attorney, Agent, or Firm—Morton J. Rosenberg; David I. Klein

[57] ABSTRACT

A collapsible recuperating walker having a seat frame, a standing frame, collapsing units and two brake units. Each collapsible unit consisting of bendable tube joints connected in intermediate portions of upper horizontal tubes and lower horizontal tubes of the seat frame and the standing frame. The collapsible units are capable of being folded so as to make the recuperating walker collapsible to a smaller dimension for transportation or storage. The brake units are used to break the casters and are provided below the standing frame.

2 Claims, 6 Drawing Sheets ns4,261,682

COLLAPSIBLE RECUPERATING WALKER

BACKGROUND OF THE INVENTION

A conventional recuperating walker shown in FIG. 8 is made of tubes firmly connected together, unable to be collapsed and quite inconvenient for transporting, carrying or putting away.

SUMMARY OF THE INVENTION

This collapsible recuperating walker has been devised to have a collapsible unit and a brake unit with an adjusting means combined with a conventional recuperating walker.

The collapsible unit consists of a plurality of tube joints bendably structured to be connected in intermediate portions of upper and lower horizontal tubes in a seat frame and a standing frame so that both frames can be collapsed to dimensions small enough for carrying or putting away. The brake unit with an adjusting means includes two ropes respectively connected between a brake lining held under an anti-vibration base fixed under the standing frame and an adjusting base on an upper horizontal tube of the standing frame. And an adjusting rod in the adjusting base is operated by a patient using this walker to pull the rope to move the brake lining to stop or to let the caster roll with various hardness for the patient to exercise walking.

BRIEF DESCRIPTION OF DRAWINGS

The invention will be better understood by reference to the accompanying drawings, wherein.

DETAILED DESCRIPTION OF THE INVENTION

Figure 1:
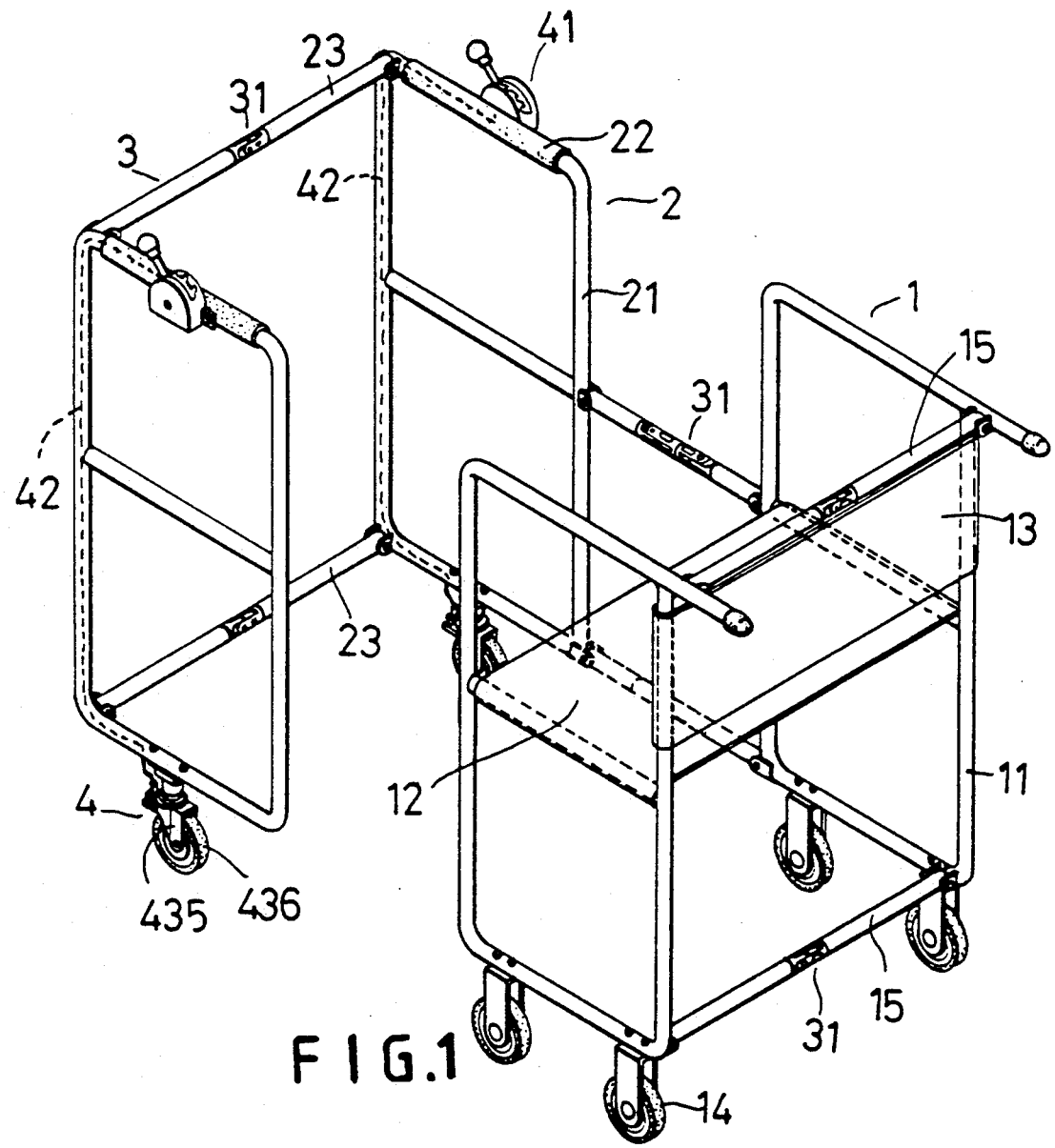
FIG. 1 is a perspective view of a collapsible recuperating walker in the present invention.

A collapsible recuperating walker in the present invention, as shown in FIG. 1, comprises a seat frame 1, a standing frame 2, a collapsible unit 3, and two brake units 4 as main components.

The seat frame 1 has U-shaped frame body 11 made of tubes, a flexible seat 12 made of a soft material like canvas for a user to sit thereon, a back rest 13 also made of soft material secured on a rear side of the frame body 11 to receive a back of a patient using this walker, and casters 14 fixed under four corners of a bottom of the frame body 11 to stand and move on the ground.

The standing frame 2 is U-shaped and made of tubes, having a front side and a right and a left flank side connected with the front side and a protective soft cushion 22 wound around a horizontal upper tube of the right and the left flank side. The standing frame 2 is connected with the seat frame 1 by means of two horizontal tubes in front of the seat frame so that a patient sitting on the seat 12 can try to stand with his hands holding the cushions 22, 22 inside the standing frame 2 for walking exercise.

The collapsing unit 3 has a plurality of tube joints 31 connected in intermediate portions of horizontal tubes 23, 23 in the front side of the standing frame 2, two horizontal tubes 15, 15 of the rear side of the frame body 11 of the seat frame 1, and the two horizontal tubes connecting both frames 1, 2.

Figure 2:
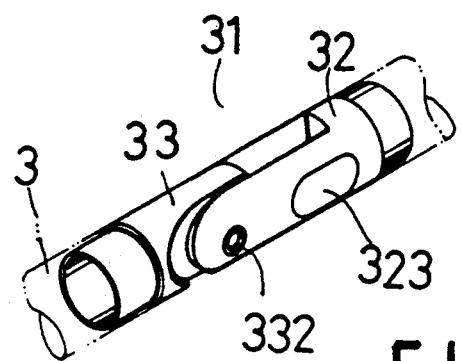
FIG. 2 is a perspective view and FIG. 2A is a cross-sectional view of a tube joint in a collapsible unit in the collapsible recuperating walker in the present invention.
Figure 2A:
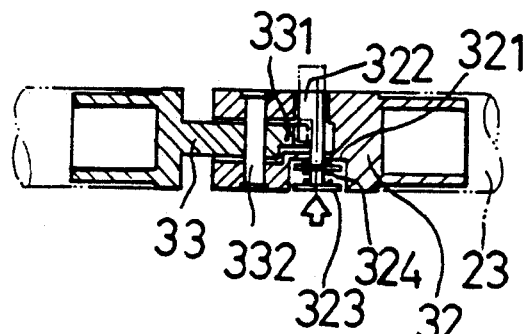
Figure 3:
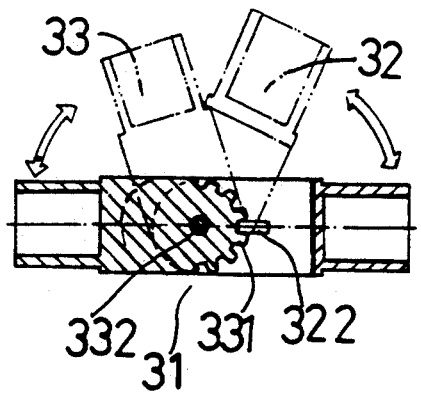
FIG. 3 is a perspective view of the tube joint in the collapsible unit to be bent in the present invention.
Figure 5:
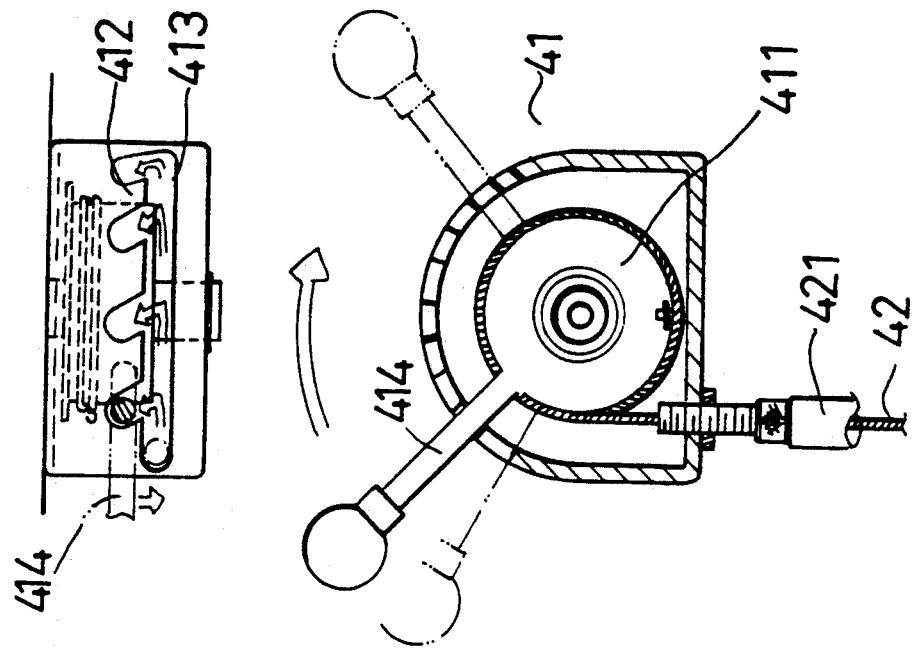
FIG. 5 is a cross-sectional view of an adjusting rod in an adjusting base to be moved to stop a caster in the present invention.

Each tube joint 31 as shown in FIGS. 2 and 2A, comprises a right half joint 32 and a left half joint 33 combined with each other to bend for collapsing the seat frame 1 and the standing frame 2. The right half joint 32 has a slot 321 in one end, a push rod 323 with a projection 322 placed in the slot 321, a spring 324 provided around the push rod 323 and having one end resting on an inner wall of the slot 321. The left half joint 33 has a fan-shaped gear 331 at one end to engage with the projection 322 of the right half joint 32, and the gear 331 is supported by a shaft 332 at its center so as to rotate. When the push rod 323 is pushed to move in the slot 321, the spring 324 is compressed to push the projection 322 outward and disengage from the gear 331 so that the gear 331 can be rotated with the shaft 332, changing its position to engage the projection 322. And thus the right and the left half joints 32, 33 can be adjusted to bend in an angle needed for collapsing this walker, as shown in FIG. 3.

Figure 4:
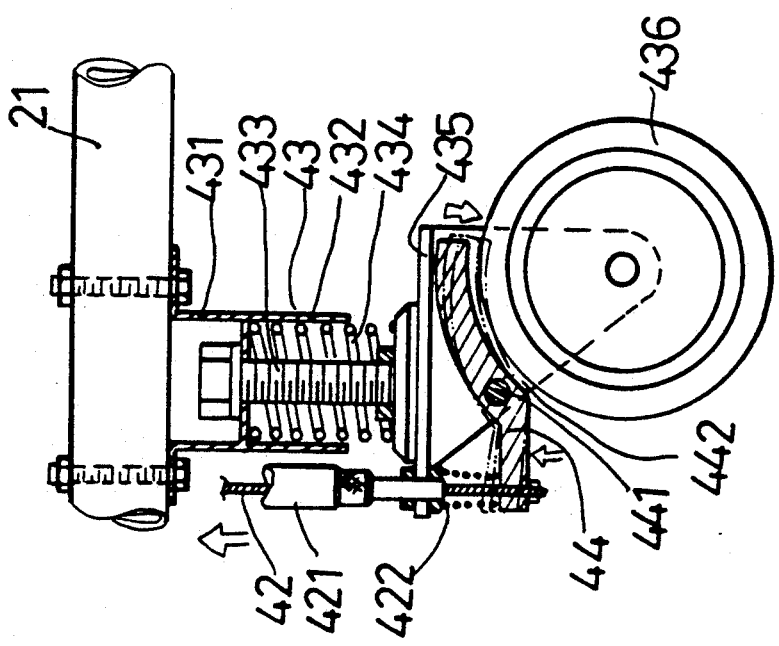
FIG. 4 is a cross-sectional view of a brake unit in the collapsible recuperating walker in the present invention.

The two brake units 4 are provided under two lower horizontal tubes of the flank sides of the U-shaped standing frame 2, comprising two adjusting bases 41, two wire ropes 42, 42, two anti-vibration bases 43, 43, and two brake linings 44, 44 as shown in FIG. 4. The two adjusting bases 41, 41 are respectively combined on the protective cushions 22, 22 of the U-shaped standing frame 2, having a wheel drum 411, a curved rail 413 provided with a plurality of grooves 412 equally spaced apart, and an adjusting rod 414 connected with and moving the wheel drum 411 together. The adjusting bases 41, 41 respectively have a head 421 at one end, and the head 421 is connected with the wire rope 42, which is provided to extend lengthwise through a lower horizontal tube, a vertical tube and then the upper horizontal tube covered with the cushion 22 and wound around the wheel drum 411. One end of the rope 22 is connected with one end of the brake lining 44, which is supported by a pivotal rod 441 at its intermediate portion so that the other end of the brake lining 44 can be moved down to go near and touch the caster 436 for controlling or stopping movement of the caster 436.

The anti-vibration base 43 includes securing member 431 for fixing the base 43 under a lower horizontal tube of one flank side of the U-shaped standing frame 2, a socket 432 extending down from the securing member 431 to house a rod 433, a coil spring 434 fitting around the rod 433 for preventing the frame 2 from vibrating, a caster base 435, and a caster 436 pivotally combined under the caster base 435. The brake lining 44 is positioned near the caster 436 separated with an aperture 442, supported by a shaft 441.

In using, a patient who cannot walk is carried by a nurse or an attendant to sit on the seat 12, and then holds with his hands the protective cushions 22 on the upper horizontal tubes of the flank sides of the frame 2. Next, the tries to stand on the ground with his feet for recuperating exercise. In exercise, he can adjust forward movement of the casters 436, depending upon movement of his own feet, by using the adjusting rods 414, 414 of the adjusting bases 41, 41 letting the rods 414 engage one of the grooves 412, 412 in the curved rails 413, 413 to pull the ropes 42, 42 to wind longer around the wheel drums 411, 411 so that the other ends of the ropes 42, 42 may pull up higher one ends of the brake linings 44, 44 to make the other ends of the brake linings 44 to move down to touch more tensely the casters 436, 436. Tensity of friction between the brake linings 44, 44 and the casters 436, 436 depends on the distance of the adjusting rods 414, 414 moved to engage one of the grooves 412, 412. The stronger the tensity is, the harder the casters 436, 436 move. In other words, the patient has to give out more force in his feet in moving forward this walker, which means to increase recuperating effect. Besides, he can stop the walker in emergency.

Figure 6:
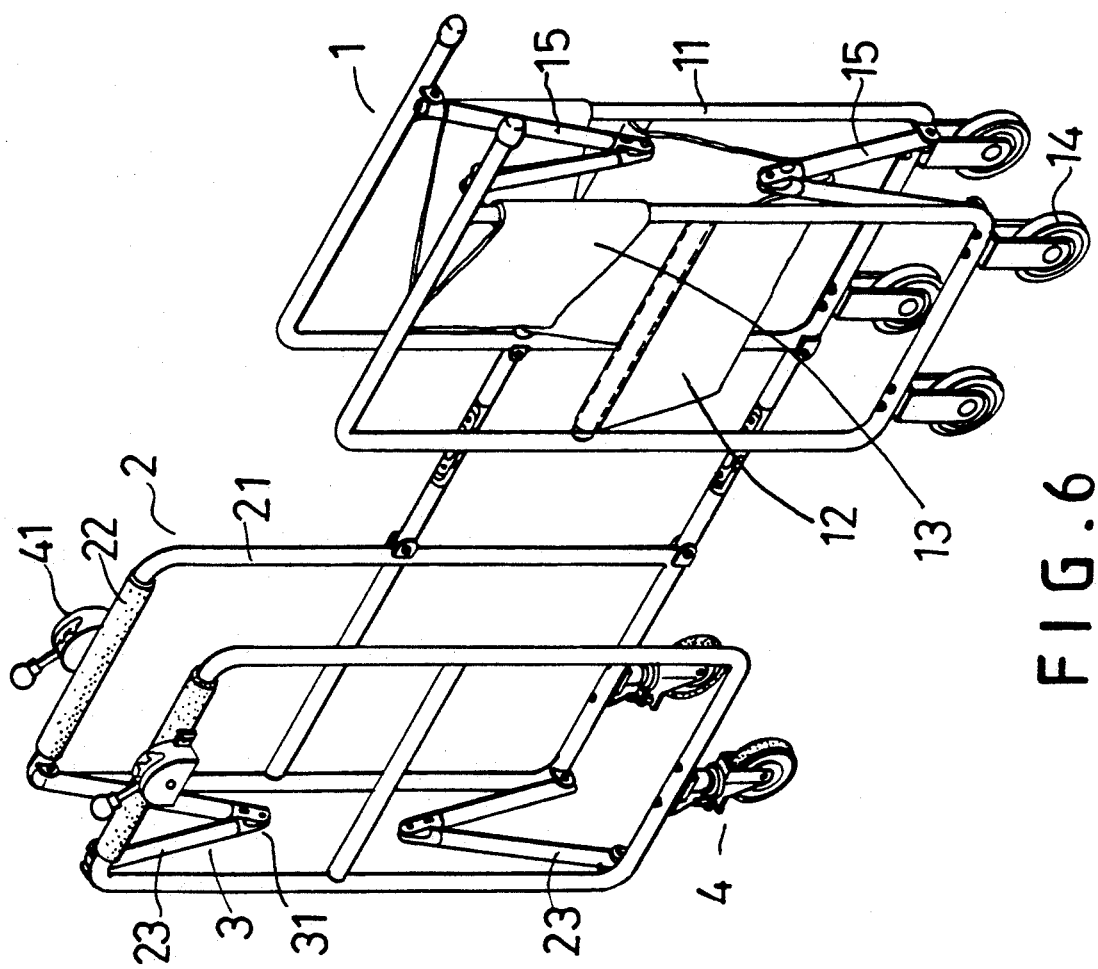
FIG. 6 is a perspective view of the collapsible recuperating walker collapsed to a first position in the present invention.
Figure 7:
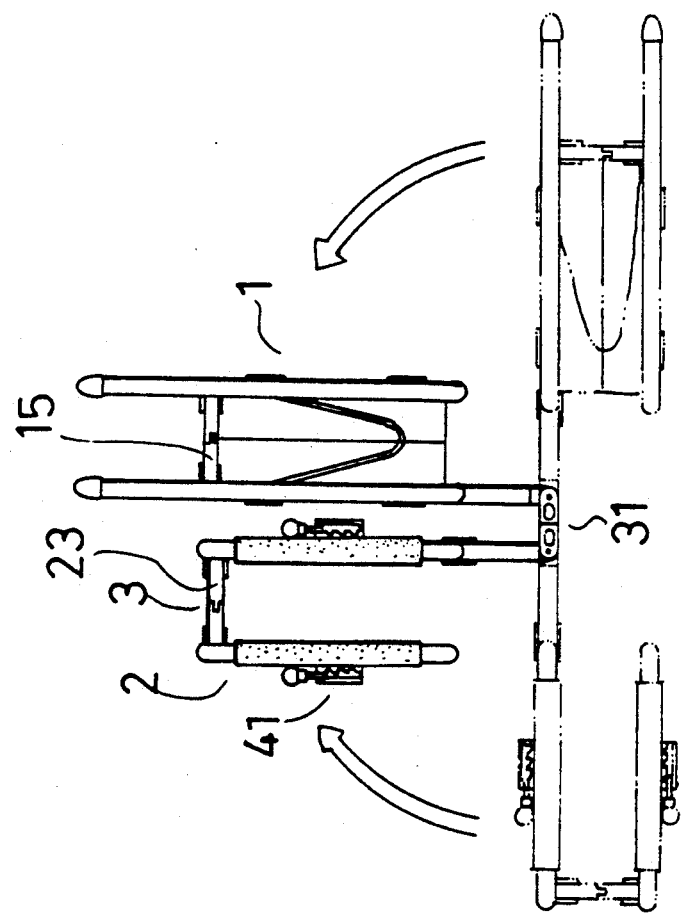
FIG. 7 is a perspective view of the collapsible recuperating walker collapsed to a second position in the present invention; and, FIG. 8 is a perspective view of a conventional recuperating walker.
Figure 8:
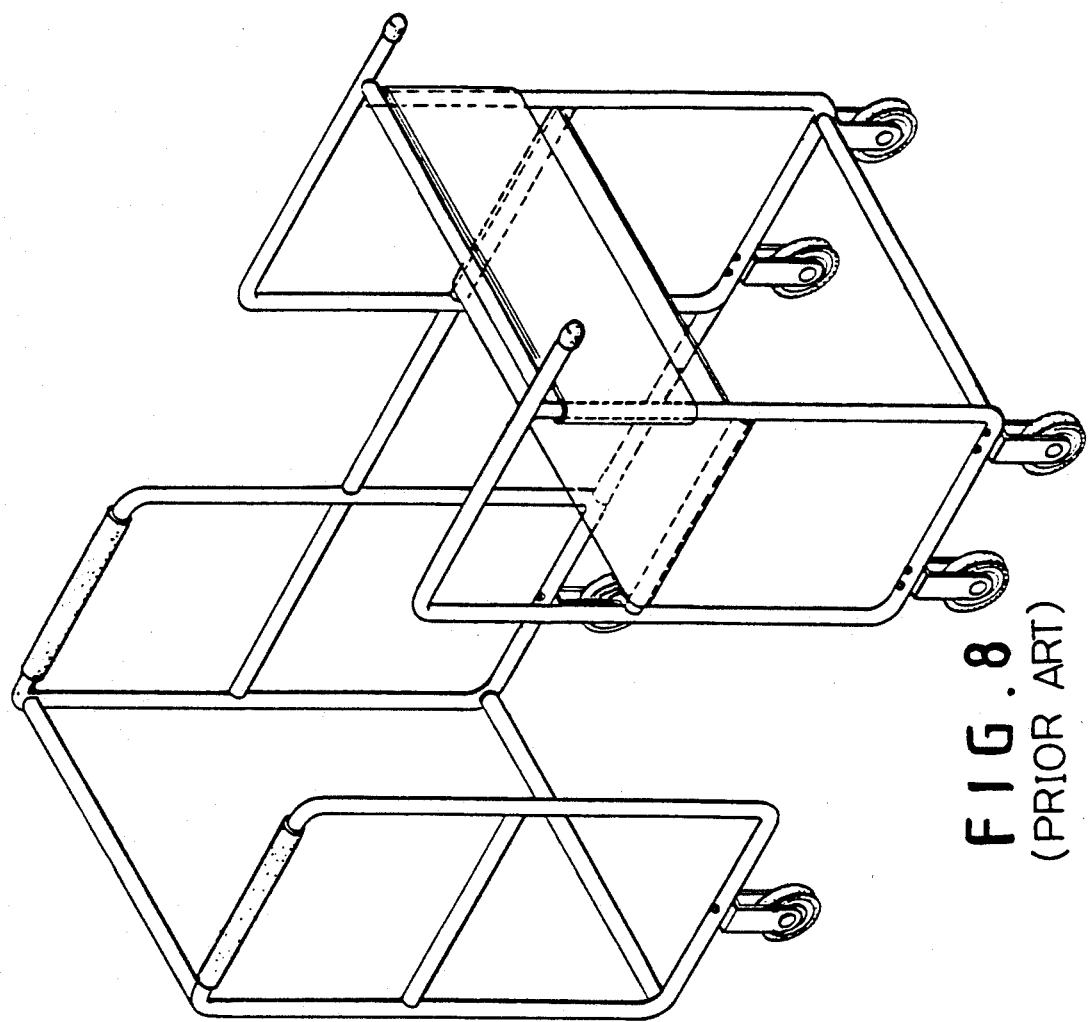

In collapsing this walker, referring to FIGS. 6 and 7, the tube joints 31 in the upper and lower horizontal tubes 23 in the front sides of the standing frame 2 and the upper and the lower horizontal tubes 15, 15 in the seat frame 1 are bent downward or upward, by pressing the pressing rod 323 into the slot 321 to compress the spring 324 and to let the projection 322 disengage from the gear 331. Then the gear 331 can be rotated with the shaft 332 as a pivot, being changed in its position to engage the projection 322, enabling the right half joint 32 and the left half joint 33 to bend against each other in an angle needed. Then both the frames 1, 2 are collapsed to a first position shown in FIG. 6, wherein the two flank sides of the seat frame 1 and the standing frame 2 are pulled to move nearer to each other. The seat frame 1 can be bent through a 90° angle to lie adjacent the standing frame 2, as shown in FIG. 7, which is convenient for transportation or storage.

While the preferred embodiments of the invention have been described above, it will be recognized and understood that various modifications may be made therein and the appended claims are intended to cover all such modifications which may fall within the spirit and scope of the invention.

What is claimed is:

1. A collapsible recuperating walker comprising:
    a U-shaped seat frame made of tubes defining a pair of opposing flank sides and a rear side extending between said opposing flank sides, each of said flank sides and said rear side having a first upper and a first lower horizontal tube extending between horizontally spaced first vertical members, a flexible seat provided at a proper height for sitting and extended between the two flank sides, a back rest mounted to the rear side, and casters mounted to a bottom portion of the first lower horizontal tubes of said flank sides to stand and move on a base surface;
    a U-shaped standing frame made of tubes having opposing transverse sides and a front side extending between said opposing transverse sides, each of said transverse sides and said front side having a second upper and a second lower horizontal tube extending between horizontally spaced second vertical members, said standing frame being connected with the seat frame by means of an upper horizontal connection tube and a lower horizontal connection tube, said upper and lower connection tubes extending between the seat frame and the standing frame, each said horizontal connection tube having a tube joint at an intermediate portion thereof, a pair of casters mounted to said transverse sides, each of said pair of casters being mounted to a lower portion of a respective one of said second lower horizontal tubes;
    a plurality of bendable tube joints provided at intermediate portions of said first upper and lower horizontal tubes of the rear side of the seat frame and said second upper and lower horizontal tubes of the front side of the standing frame, said bendable tube joints respectively having a right half joint and a left half joint combined bendably, each of said right half tube joints having a slot at one end, a push rod with a projection at one end deposited in the slot, a coil spring provided to fit around the push rod, each of said left half joints having a fan-shaped gear to engage the projection in the corresponding right half joint, the fan-shaped gear supported by a shaft at its center to let the gear rotate when the projection is in a disengaged position, the gear being rotated to let the corresponding right and the left half joints bend relative to each other, enabling the seat frame and the standing frame to be collapsed; and,
    two brake units for stopping the two casters mounted to the standing frame.

2. The collapsible recuperating walker as claimed in claim 1, wherein said brake units include two adjusting bases, two wire ropes, two anti-vibration bases and two brake linings, each said adjusting base having a wheel drum, a curved rail in an outer edge having a plurality of grooves equally spaced apart, an adjusting rod connected and moving together with the wheel drum for engaging one of said grooves in the rail, each said wire rope having one end wound around the wheel drum, fixed firmly thereon and the other end fixed to one end of the brake lining under the anti-vibration base, each said wire rope extending lengthwise within a set of cooperating horizontal and vertical tubes of the standing frame, each said antivibration base fixed under the respective second lower horizontal tubes of the standing frame, having a socket and a rod in the socket, each said antivibration base having a respective spring provided to fit around said rod in the socket so that said respective spring elastically supports the socket and the standing frame to avoid vibration, and respective casters mounted below a respective brake lining and supported within a respective socket, whereby in response to selective positioning of a respective adjusting rod in a respective adjusting base on the second upper horizontal tube of a respective transverse side of the standing frame a respective brake lining is pulled by a respective rope to move down to touch and brake a respective caster.

* * * * *